Jan. 6, 1942.  L. R. WILLIAMSON  2,269,328
HYDRAULIC HOLD-DOWN
Filed Jan. 9, 1939  3 Sheets—Sheet 1

INVENTOR.
LARKIN R. WILLIAMSON
BY Horace B. Clay
ATTORNEY

Jan. 6, 1942.     L. R. WILLIAMSON     2,269,328
HYDRAULIC HOLD-DOWN

Filed Jan. 9, 1939     3 Sheets-Sheet 2

INVENTOR.
LARKIN R. WILLIAMSON
BY Horace B. Fay
ATTORNEY.

Jan. 6, 1942.   L. R. WILLIAMSON   2,269,328
HYDRAULIC HOLD-DOWN
Filed Jan. 9, 1939   3 Sheets-Sheet 3
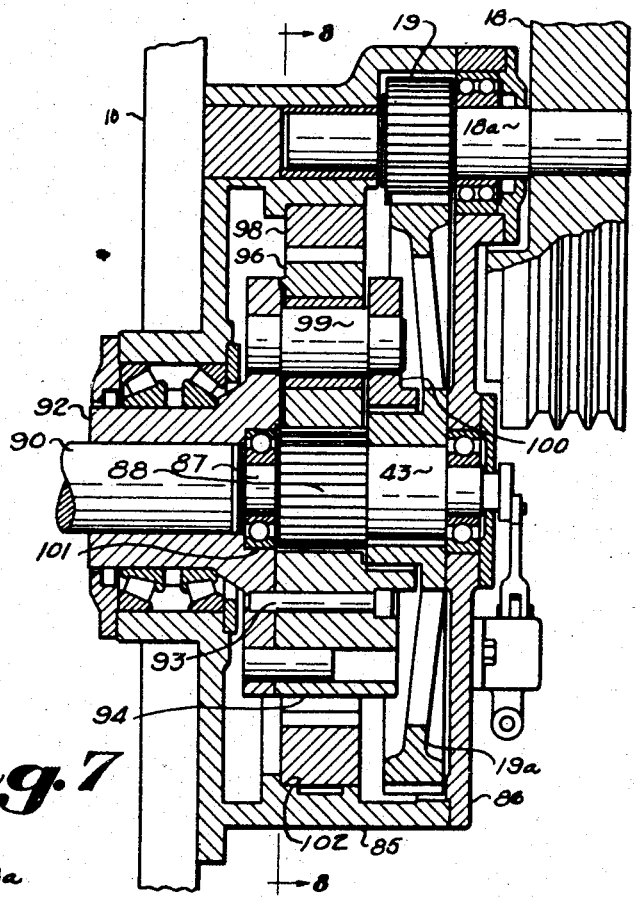
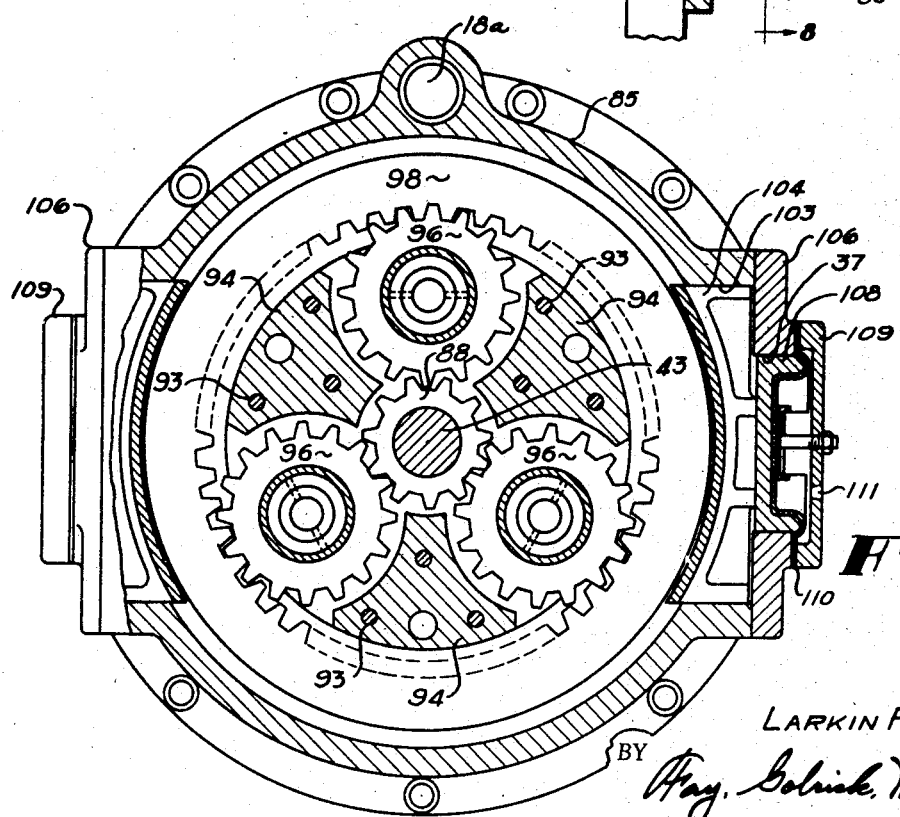
INVENTOR.
LARKIN R. WILLIAMSON
BY
ATTORNEYS.

Patented Jan. 6, 1942

2,269,328

UNITED STATES PATENT OFFICE 2,269,328

HYDRAULIC HOLD-DOWN

Larkin R. Williamson, Brooklyn, N. Y., assignor to E. W. Bliss Company, Brooklyn, N. Y., a corporation of Delaware Application January 9, 1939, Serial No. 249,890

8 Claims. (Cl. 164—52)

This invention relates to hold-down mechanism and particularly to a hydraulic hold-down system adapted for use in holding a plate or sheet while the same is acted upon by a tool. More specifically, my invention is directed to such a hold-down mechanism in connection with a power shear.

Hydraulic hold-down systems in general are not new but insofar as I am aware have always been subject to various disadvantages. With hold-downs as heretofore used it has not been possible to operate the hold-down mechanism independently of the tool with which it was used. Prior mechanisms have also required a relief valve or a pressure bell to allow for variation in the line pressure to the hold-downs. In addition, these prior devices have been subject to leakage at the hold-down proper, which resulted in gumming the work and requiring a cleaning operation after the piece was sheared.

The general object of my invention has been to devise a hydraulic hold-down system which may be operated independently of the tool with which it is used, thus permitting the work to be gripped before a subsequent operation starts the machine to act on the sheet. A further object has been to provide a system in which variation in the fluid pressure in the line is automatically compensated for by the pump. Other objects of the invention will become apparent from the specification, drawings and claims.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:

Fig. 7 is a detail magnified cross-section taken substantially on the line 7—7 of Fig. 2; and Fig. 8 is a detail magnified cross-section taken on the line 8—8 of Fig. 7.

Figure 1:
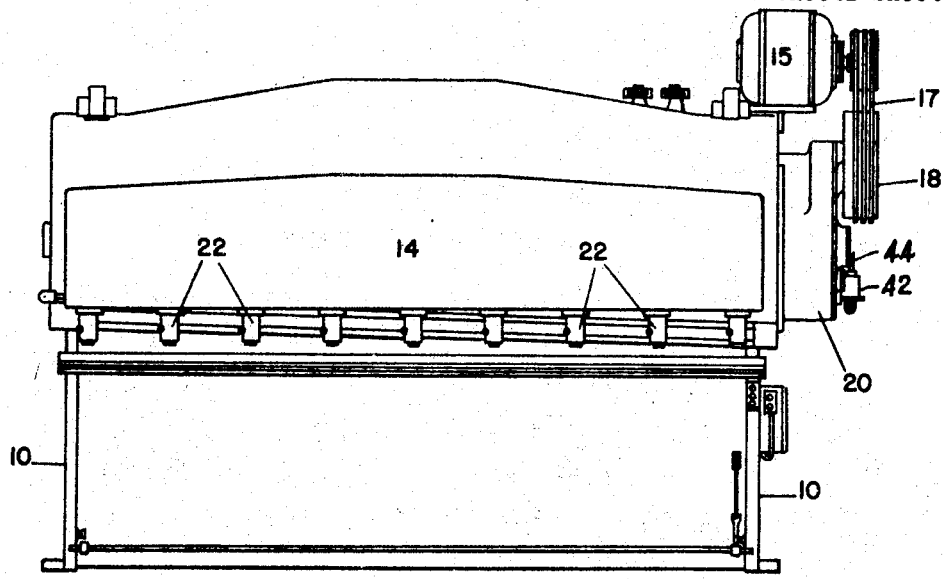
Fig. 1 is a front elevation of a shear employing my hold-down.
Figure 2:
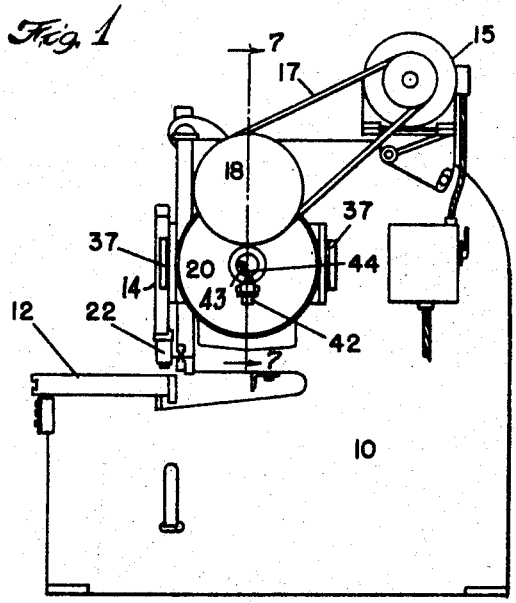
Fig. 2 is a side elevation of such a shear looking from the right in Fig. 1.

Referring now to Figs. 1 and 2, I use my mechanism in conjunction with a power shear employing the usual side plates 10, bed 12 and ram or slide 14, which carries the movable knife. The ram is driven by a suitable motor 15 acting through belting 17 to drive a pulley 18. A gear 19 on the shaft 18a of the pulley 18 engages a drive member 19a of a clutch 20 and continuously rotates such member. The clutch 20, which may be of any type well known in the art, is hydraulically operated to couple the motor 15 operatively through mechanism to reciprocate the ram 14.

A series of hold-down members 22 is carried by the shear immediately in front of and is preferably secured to the ram and, as further described, is adapted to engage work resting on the bed 12 to secure the same against displacement upon descent of the ram 14 and its associated shear knife.

Figure 4:
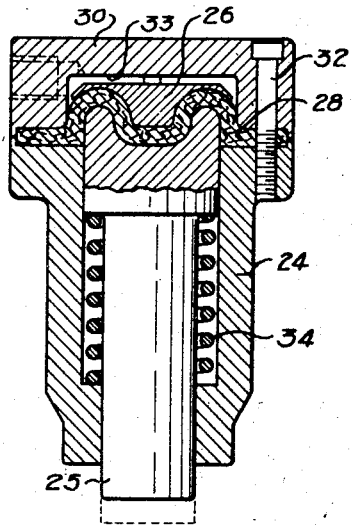
Figure 3:
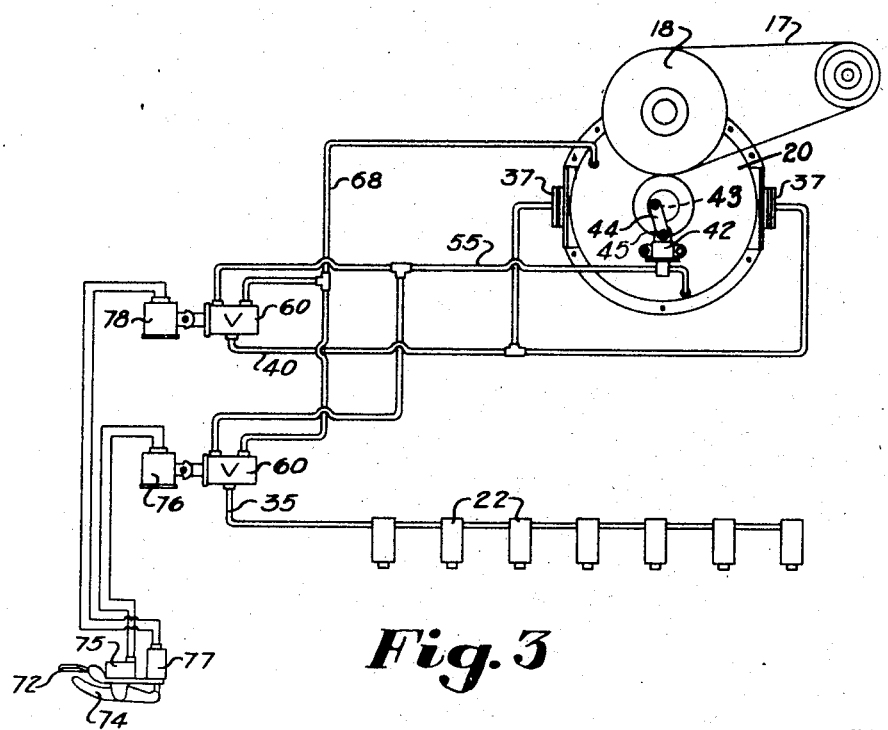
Fig. 3 is a schematic diagram showing the fluid lines connecting the shear and clutch and also connecting the hold-downs.

These hold-down members, as shown in Fig. 4, each comprises a cylinder 24 and a piston 25, the lower end of which engages the work. The upper end of each piston is shaped as shown in Fig. 4 and is provided with a cap 26 to secure a packing diaphragm 28 to the piston. The outer annular portion of the diaphragm is sealed against the cylinder 24 by a cylinder cap 30 suitably bolted thereto as at 32. Oil, as hereinafter described, is admitted to the chamber 33 to actuate the hold-downs, which are normally held retracted by springs 34 interposed between the cylinder and the piston. The several hold-downs, as shown in Fig. 3, are connected to a unit to be operated from a single fluid line 35. The clutch which controls the driving of the ram is hydraulically operated and is actuated by the admission of oil under pressure to two opposed cylinders 37. The oil to the clutch is admitted through a common line 40.

Figure 5:
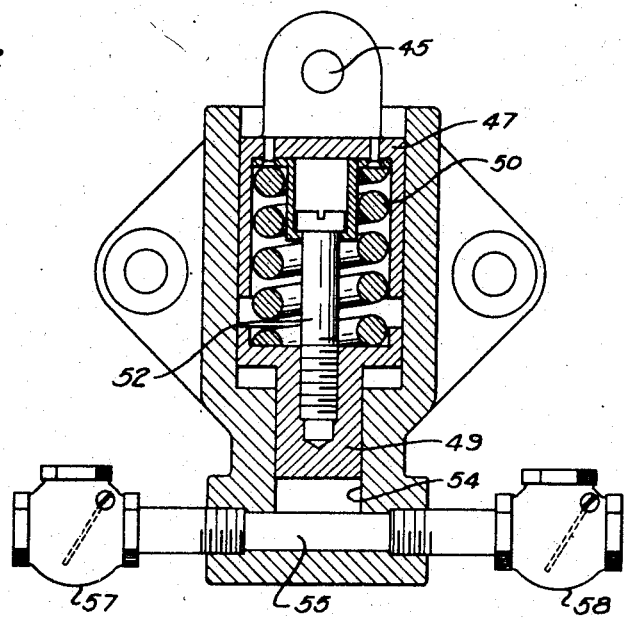

Oil under pressure is supplied to operate the clutch line 40 and the hold-down line 35 from a pump, best shown in Fig. 5 and indicated generally at 42. This pump is driven from the shaft 43 of the clutch 20, which shaft is continually rotated by the drive member 19a and drives a connecting rod 44 at the end of the shaft, which is pivoted as at 45 to a piston plunger comprising two parts 47 and 49. These two parts are normally maintained separate from each other by a strong compression spring 50, but are limited in their movement apart by a central bolt 52 engaging the parts 47 and 49. The part 49 is closely fitted into a cylinder 54 and reciprocation in this cylinder builds up the necessary oil pressure in line 55, which supplies the working parts of the unit.

From a description of the pump it will be seen that I have incorporated mechanism therein to very simply control the operation of the pump piston in accordance with the varying pressure in the line. For instance, if the line pressure drops below a predetermined point, governed by the calibrated spring 50, the spring will act as a rigid member to reciprocate the part 49 integrally with the part 47 and thus restore the fluid pressure to the system. On the other hand, if the pressure is at a predetermined value, which is equivalent to or slightly greater than the compressive strength of the spring 50 the part 49 of the pump will remain idle and the part 47 will continue movement, acting only to compress the spring. By this novel construction I provide a pump which is continuously driven, but the effective operation of which is controlled by the pressure in the line.

Figure 6:
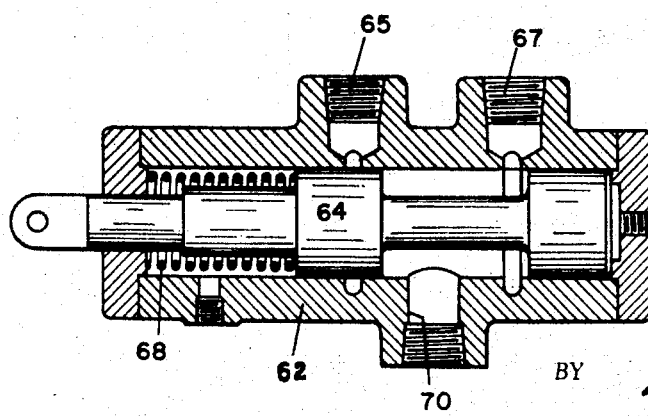
Figs. 4, 5 and 6 are sectional details of the hold-downs proper, pump and control valve mechanism, respectively.

The pump supplies the line 55 which, at one side passes through a check valve 57 and leads to two double acting valves 60, as shown in Fig. 6. The check valve acts to maintain the pressure at the valves 60 and prevent its fall each time the member 49 is raised to increase the effective volume of the cylinder 54. The other side of the line 55 leads through a second check valve 58 to an oil reservoir and this valve is mounted to prevent transmitting the built-up fluid pressure into the reservoir, but will permit oil to be sucked into the line 55.

The double acting valves 60 are best shown in Fig. 6 and I provide one to operate the clutch and one to operate the hold-downs. To this end I provide a cylinder 62, in which reciprocates a double piston 64 to control a pair of openings 65 and 67. The coil spring 66, bearing at one end on the cylinder cap and at the other end on the piston, normally retains the mechanism in the position shown in Fig. 6 to open the opening 67 and seal the opening 65. In each instance the corresponding opening 65 of the mechanism is connected to the line 55 leading to the pump and, similarly, each opening 67 connects to a line 68 which is a discharge passage back to the oil reservoir. Each valve is also provided with a central opening 70, which communicates respectively with lines 35 and 40 to admit oil to the hold-downs or the clutch. From the description thus far it follows that when the valve mechanism is in the position of Fig. 6 oil may pass freely from either the clutch or hold-down back to the oil reservoir. When the piston 64 is moved to the left to seal the opening 67 the opening 65 is free to transmit oil under pressure from the line 55 to either the clutch or hold-down, as the case may be.

The foot pedal mechanism shown in Fig. 3 is employed to control the position of the above mentioned pistons 64 of the two valves 60. This pedal mechanism comprises two parts, 72 and 74, each pivoted to the main frame of the shear. The pivoted portion 72 controls a contact box 75 to couple a suitable source of electric power to a solenoid 76 which may draw the piston of the associated valve 60 to admit oil to the hold-downs, or may release the piston to release the pressure in the hold-downs. Similarly, the foot-pedal portion 74 acts, through a contact box 77, to connect the solenoid 78 with a suitable source of power. This solenoid controls the operation of its associated valve mechanism 60 to actuate the clutch 20 which will now be described.

The clutch is best seen in Figs. 7 and 8 wherein mounted upon the frame 10 is a clutch housing 85 to which is suitably bolted a cover plate 86. The pulley 18 drives a shaft 18a to which there is keyed a pinion 19a which drives a shaft 43, one end of which is journalled in the cover plate 86 and the other end 87 of which is journalled in a manner to be presently described. Keyed to the shaft 43 is a pinion 88 which in a manner about to be described is in mesh with planetary gears. A shaft 90 has keyed thereto a spider block 92 which is journalled in the housing 85 and to which there is suitably attached, as by means of bolts 93, spacer blocks 94. Between adjacent spacer blocks there is a planetary gear 96 which, as above indicated, is in mesh with pinion 88 and also in mesh with an internal gear 98. The planetary gears rotate about sub-shafts 99 one end of each of which is journalled in the spider block 92 and the other end of each of which is journalled in a cap 100 which is secured to the spider block.

The spider block is provided with an axial bore 101 into which the other end 87 of the shaft 43 is journalled.

The outer periphery of the internal gear 98 freely floats on an annular slideway 102 of the housing 85. In order to brake the internal gear and consequently set up a drive between the pulley 18 and the shaft 90 suitable braking mechanisms are provided and will now be described.

Diametrically opposed openings 103 are provided in the housing and accommodate brake shoes 104. Each of these openings is closed by a cap 106 which is provided with one of the said cylinders 27 for accommodating a piston 108 suitably secured to the brake shoe. Each cylinder is provided with a cap 109 and a diaphragm 110. Fluid pressure created in the clutch line 40 enters the cylinders 37 through an opening 111 in the cap 109 and actuates the pistons 108.

It is thus seen that when the brake shoes are in retracted position no power is transmitted from the pulley 18 to the shaft 90. It is also seen that depending on the degree of slippage between the brake shoes and the internal gear, the power transmitted from the pulley 18 to the shaft 90 can be varied from zero up to a maximum.

In operation a workman first places a sheet of material on the bed 12 and then steps on the member 72 of the foot pedal mechanism, depressing the same slightly. This energizes the solenoid 76, drawing the associated piston 64 to the left and admits oil under pressure to the hold-down chambers 33, whereupon the hold-downs proper 25 clamp the work to the bed. When the workman is assured that the piece is clamped in the proper position he exerts more pressure on the portion 72, pushing the same on down to engage and rock the member 74. This then actuates the solenoid 78 to admit pressure to the line 40, engage the clutch, and reciprocate the ram 14 to shear the work.

From the foregoing description it will be seen that I have not only provided a simple and improved hold-down mechanism, but I have provided one which may be controlled by a workman in operating an associated shear to govern the hold-down independently of the operation of the ram.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a machine tool comprising movable shearing means and hydraulic hold-down means for clamping work in timed relation with said shearing means, the combination of a plurality of hold-down cylinders comprising pistons responsive to fluid pressure and adapted alternately to grip and release said work, clutch mechanism to connect said shearing means to a driving means, a fluid system under pressure to control said hold-down and said clutch mechanism, a valve mechanism to actuate said hold-down means, a second valve mechanism to actuate said clutch mechanism and a control member movable to two positions, one of said positions actuating said first valve mechanism and the second of said positions actuating the second valve mechanism.

2. In a machine tool comprising movable shearing means and hydraulic hold-down means for clamping work in timed relation with said shearing means, the combination of a plurality of hold-down cylinders comprising pistons responsive to fluid pressure and adapted alternately to grip and release said work, clutch mechanism to connect said shearing means to a driving means, a fluid system under pressure to control said hold-down and said clutch mechanism, a valve mechanism to actuate said hold-down means, a second valve mechanism to actuate said clutch mechanism and a control member movable to two positions, one of said positions actuating said first valve mechanism and the second of said positions controlling said second valve mechanism, thereby to connect or disconnect the clutch mechanism while said first valve mechanism remains actuated.

3. In a machine tool comprising movable shearing means and hydraulic hold-down means for clamping work in timed relation with said shearing means, the combination of a plurality of hold-down cylinders comprising pistons responsive to fluid pressure and adapted alternately to grip and release said work, clutch mechanism to connect said shearing means to a driving means, a fluid system under pressure to control said hold-down and said clutch mechanism, a valve mechanism to actuate said hold-down means, a second valve mechanism to actuate said clutch mechanism, a control member movable to two positions and two solenoids to cooperate with said control member, one of said positions actuating the first solenoid and thereby the first valve mechanism and the second of said positions actuating the second solenoid and thereby the second valve mechanism.

4. In a machine tool comprising movable shearing means and hydraulic hold-down means for clamping work in timed relation with said shearing means, the combination of a plurality of hold-down cylinders comprising pistons responsive to fluid pressure and adapted alternately to grip and release said work, clutch mechanism to connect said shearing means to a driving means, a fluid system under pressure to control said hold-down and said clutch mechanism, a valve mechanism to actuate said hold-down means, a second valve mechanism to actuate said clutch mechanism, a control member movable to two positions and two solenoids to cooperate with said control member, one of said positions actuating said first solenoid and thereby the first valve mechanism and the second of said positions controlling the second solenoid and thereby the second valve mechanism while said first valve mechanism remains actuated.

5. In a machine tool comprising a movable shearing member, power means to drive said shearing member, a separable connection interposed between said shearing member and said driving means, a work supporting member, hydraulic clamping means to clamp work in position on said work supporting member, and a fluid system to control the operation of said separable connection and said clamping means, in combination a plurality of hold-down cylinders, pistons in said cylinders adapted to grip the work, resilient means to normally maintain said pistons in a retracted position, a pump to supply fluid under pressure to said cylinders, a valve mechanism to connect said pump and said cylinders, and a single member shiftable to first actuate said clamping means in clamping relation with said work and shiftable thereafter to actuate the mechanism coupling the shearing member to a driving means.

6. In a machine tool comprising a movable shearing member, power means to drive said shearing member, a separable connection interposed between said shearing member and said driving means, a work supporting member, hydraulic clamping means to clamp work in position on said work supporting member, and a fluid system to control the operation of said separable connection and said clamping means, in combination a plurality of hold-down cylinders, pistons in said cylinders adapted to grip the work, springs in said cylinders normally tending to maintain said pistons in a retracted position, a pump to supply fluid under pressure to said cylinders, a valve mechanism to connect said pump and said cylinders, a second valve mechanism to actuate said clutch mechanism, and a single member shiftable to first actuate said valve mechanism for bringing clamping means in clamping relation with said work and shiftable thereafter to actuate the said second valve mechanism for coupling the shearing member to a driving means.

7. In a machine tool comprising movable shearing means and hydraulic hold-down means for clamping work in timed relation with said shearing means, the combination of a plurality of hold-down cylinders comprising pistons responsive to fluid pressure and adapted alternately to grip and release said work, clutch mechanism to connect said shearing means to a driving means, a continuously operated pump to maintain said fluid under pressure, means in said pump to render the same ineffective upon establishing a predetermined pressure in the system, a valve mechanism to actuate said clamping means, a second valve mechanism to actuate said clutch mechanism and a control member movable to two positions, one of said positions actuating said first valve mechanism and the second of said positions actuating the second valve mechanism.

8. In a machine tool comprising movable shearing means and hydraulic hold-down means for clamping work in timed relation with said shearing means, the combination of a plurality of hold-down cylinders comprising pistons responsive to fluid pressure and adapted alternately to grip and release said work, fluid responsive clutch mechanism to connect said shearing means to a driving means, a pump for maintaining pressure in a system for said fluid responsive member, said pump including two members normally movable as a unit, a resilient means connecting said two members and operative on attaining a predetermined pressure in said system to become deformed and allow one of said members to function independently of the other member, a valve mechanism to actuate said clamping means, a second valve mechanism to actuate said clutch mechanism and a control member movable to two positions, said positions being adapted to actuate the two valve mechanisms in predetermined succession.

LARKIN R. WILLIAMSON.